United States Patent [15] 3,646,460
Donohoo [45] Feb. 29, 1972

[54] MODULATED ON-TO-OFF RATIO PULSE CONTROLLED DIGITAL-TO-ANALOG CONVERTER

[72] Inventor: Daniel J. Donohoo, Shoreview, Minn.
[73] Assignee: Dantronics Inc., St. Paul, Minn.

[22] Filed: Nov. 13, 1969
[21] Appl. No.: 876,488

[52] U.S. Cl. ..............................329/102, 307/232, 307/246, 307/255, 328/67, 328/115, 329/106
[51] Int. Cl. ..........................................................H03k 9/08
[58] Field of Search..................329/101, 102, 103, 106, 109; 328/115, 67; 307/232, 255, 246

[56] References Cited

UNITED STATES PATENTS

| | | | |
|---|---|---|---|
| 3,457,435 | 7/1969 | Burns et al. | 307/246 X |
| 3,418,495 | 12/1968 | Bose | 307/246 X |
| 3,188,495 | 6/1965 | Grimm | 329/101 X |
| 2,719,225 | 9/1955 | Morris | 329/109 |
| 2,997,606 | 8/1961 | Hamburger et al. | 307/246 |

*Primary Examiner*—Alfred L. Brody
*Attorney*—Daniel J. Meaney, Jr.

[57] ABSTRACT

An amplification-measuring apparatus for determining amplification of an active device having a control input and a controlled output is shown. The apparatus includes a regulated voltage source, a constant current source for operating the active device while the amplification measurements are being made thereon, a difference amplifier for producing a control signal having at least a predetermined magnitude, a converting means for producing an input signal in response to the control signal, which input signal is applied to the control input for operating the active device, and an analog signal-producing means which converts the control signal into an analog signal representing the amplification of the active device.

Also disclosed is an output-indicating means which is responsive to the analog signal for directly representing as a visual readout the amplification of the active device. In addition, a control means and a modulated on-to-off ratio control pulse generator are disclosed which are adapted for use in said amplification measuring device.

12 Claims, 4 Drawing Figures

INVENTOR.

DANIEL J. DONOHOO

BY

Daniel J. Meaney, Jr.

ATTORNEY

INVENTOR.
DANIEL J. DONOHOO
BY
Daniel J. Meaney, Jr.
ATTORNEY

MODULATED ON-TO-OFF RATIO PULSE CONTROLLED DIGITAL-TO-ANALOG CONVERTER

It is known in the prior art to use apparatus for measuring the amplification of a semiconductor. Typical apparatus for accomplishing this measurement may be generally classified within two categories.

The first category includes apparatus generally known as transistor curve tracers. Typical of such apparatus is the Tektronix Brand Type 575 Transistor Curve Tracer. The Type 575 Transistor Curve Tracer is a relatively expensive apparatus and operates on the principal of displaying, on an oscilloscope cathode-ray tube face, the dynamic characteristic curves of the semiconductor being measured. Amplification of the semiconductor device must be calculated from the characteristic curves. Thus, the data generated by the curve tracer must be interpreted by an operator. During such readings, the operator may make certain inherent errors such as, for example, estimating the line divisions of the scale used for the transistor curve on the cathode-ray tube face and multiplying the information therefrom times the various settings on the horizontal and vertical scale selectors. If one wants to make other readings, such as leakage current of the transistor, this task is difficult to do using the Type 575 Transistor Curve Tracer.

The second category includes apparatus which measure semiconductor amplification as a direct readout on a nonlinear scale, such as, for example, an inverse function scale. These devices are relatively inexpensive, provide relatively little information and are difficult to operate and read. Typical of such semiconductor amplification-measuring apparatus is the Sencore Brand Type TF 151 Transistor tester. The Sencore Brand TF 151 Tester includes a nonlinear scale and means for providing a direct readout of amplification of the semiconductor.

However, the apparatus for measuring the transistor amplification is very inaccurate for several reasons. One reason is that the scale must be adjusted for each measurement. Another reason is the power supply voltage used in the measuring circuit is not regulated so that the transistor amplification measurement being made is at the particular voltage level of the power supply at the time the measurement is made. Thus, the Sencore Type 151 Transistor Tester does not include means for measuring the amplification of the semiconductor at precise collector voltages.

In order to obtain a meaningful reading of the amplification of the semiconductors, the semiconductor must be operated at rated voltages and currents as set forth in the manufacturer's specifications sheet or manuals at which the particular semiconductor is rated. Thus, if the amplification is measured at voltages and currents other than the voltages and currents with the specification at which the transistor is rated, the transistor amplification reading is not only inaccurate but, in some cases is unmeaningful.

The Sencore Type 151 Tester utilizes a nonlinear output scale for readout. Thus, large-scale errors are produced such that a normal amplification measurements, which generally occur in the range of zero to one thousand, the scale is compressed. The expanded portion of the nonlinear scale is utilized for lower amplification measurements where reading errors are not as critical. For this reason, most meaningful amplification readings would have to be closely estimated on the compressed portions of the nonlinear readout scale where estimated errors are significant.

A third semiconductor tester, which is more precise than the Sencore Type 151 Transistor Tester, is the Triplet Brand Model 3490-A, Type 2, semiconductor analyzer. This device is capable of measuring both the amplification and the leakage current of the semiconductor.

However, the Triplet Model 3490-A, Type 2, semiconductor tester is extremely complicated to operate in that the operator is required to make manual settings of the various parameters. In particular, the operator must make individual settings for each and every transistor analyzed by the transistor tester. The circuitry and operation of the Triplet Model 3490-A, Type 2, Transistor Analyzer is essentially identical to a compact laboratory test unit in that various meters, power supplies, current sources and voltage source devices are provided, subject to manual adjustment by the operator, in order to obtain the desired data, also, without amplifiers this unit cannot make low current measurements accurately.

The amplification-measuring apparatus of the present invention has several advantages over the prior art devices. For example, the amplification-measuring apparatus of the present invention provides a single linear analog voltage which represents the amplification of an active device, such as, for example, a semiconductor or transistor. If desired, the readout may be visual on a linear scale.

This has a marked advantage over the Tektronix Type 575 Transistor Analyzer. Use of a linear readout scale eliminates the need for an operator to determine data from the dynamic characteristic curves on a cathode-ray tube face.

Similarly, the present invention has an advantage over the Sencore Type 151 Transistor Tester. The present invention uses a linear analog voltage and/or readout scale which eliminates errors normally introduced by an operator estimating gain readings from the compressed end of a nonlinear scale.

In the semiconductor amplification-measuring apparatus of the present invention, one need only insert the active device, such as, for example, a semiconductor or transistor to be measured, into the test stage of the apparatus. The collector voltage and control voltages are precisely controlled and need not be reset after initial set up. This is a decided improvement over the Triplet Model No. 3490-A, Type 2, Transistor Tester where the voltages and currents must be reset for each measurement. Further, by using a voltage-regulated power supply, the amplification measurements made by the apparatus of the present invention are unaffected by loading.

This is an important feature of this invention in that the regulated power supply provides the means for making measurements which are meaningful at selected and/or rated voltage levels, which voltage levels normally correspond to the specifications established by a manufacturer for each device.

In addition, the semiconductor-measuring apparatus of the present invention includes means for covering a wide range of amplifications. For example, the semiconductor-measuring apparatus can measure the amplification using a wide range of collector currents in a transistor, say, for example, from 10 microamps up to 100 milliamps or greater.

In addition, the present invention is adapted to include means from measuring the leakage current which exists in silicon- and germanium-type transistors. The leakage current normally measured are Iceo and Icbo. By using a leakage current in a low range, leakage current can be measured from as low as 10 nanoamps full scale up to 100 microamps full scale or greater current over a full scale.

Other features can be easily incorporated into the apparatus for making the testing procedure almost automatic. For example, features may include a test button for controlling the test duration, means for expanding the amplification range and means for measuring other leakage currents.

Within the control circuitry, the amplification is represented by linear analog voltage. If desired, the appropriate analog voltages can be transmitted to a digital voltage meter so that direct readout in a digital voltage format is possible. This provides a means for converting a linear analog voltage to a digital voltage through an analog-to-digital converter, which converter in turn can be used as a direct input to a computer, a line printer or the like.

If desired, one can include means for measuring the voltage drop between base and emitter and between collector and emitter. This provides a means and capability of matching and/or sorting transistor using the transistor specification provided by the manufacturer as a guide.

These and other advantages will become readily apparent when considered in light of the preferred embodiment described herein taken together with the following drawing wherein.

Figure 1:
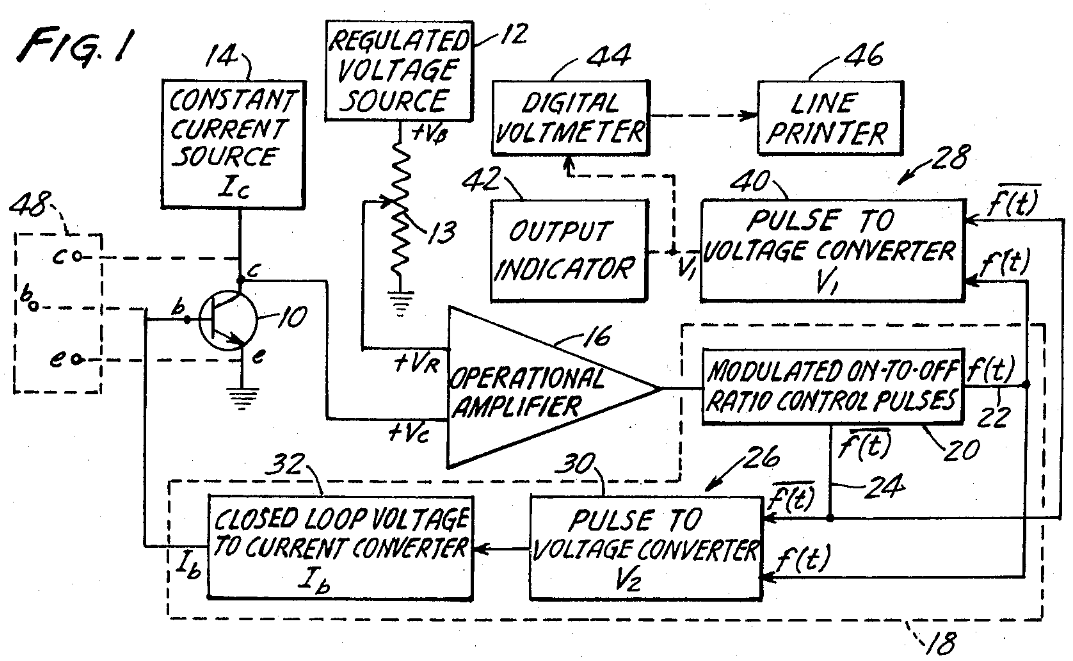
FIG. 1 is a block diagram, partially in schematic form, illustrating the embodiment of the amplification measurement apparatus of the present invention.

In FIG. 1, the apparatus for measuring the amplification of an active device, having a control input and a controlled output is shown in block form, with portions thereof being illustrated schematically. In the preferred embodiment, the active device being analyzed is a semiconductor such as an NPN- or PNP-type transistor having a base, collector and emitter.

Referring to FIG. 1, the apparatus has an input means which is adapted to receive an active device, such as a semiconductor 10 which is to be analyzed. For purpose of example, the apparatus is illustrated to have input terminals for receiving the base, collector and emitter. The apparatus generally includes a regulated voltage source having a voltage plus $V_B$ generally designated as 12 and a variable resistor 13. The regulator voltage source 12 is capable of producing a reference voltage plus $V_R$ having a predetermined amplitude, which amplitude is independent of current loading on the voltage source 12. Regulated voltage sources are well known in the art, and it is contemplated that one skilled in the art could design or obtain a design for an appropriate regulated voltage source to practice the teaching of this invention.

In addition, the apparatus includes a constant current source 14 which is operatively connected to the collector of the semiconductor 10. The current source 14 is capable of passing a constant collector current, $I_c$, through the semiconductor 10. The collector may, in its broadest aspect, be considered a controlled output.

A collector voltage, $V_c$, is developed on a controlled output by the constant current from current source 14 passing through the collector-emitter junction of the semiconductor 10 connected in a grounded emitter configuration. Both the collector voltage $+V_c$ and reference voltage $+V_R$ are applied as input voltages to a difference-amplifying means 16. The difference-amplifying means 16, in the preferred embodiment, is an operational amplifier capable of concurrently receiving the reference voltage from the regulated voltage source and the collector voltage from the semiconductor 10. The difference-amplifying means 16 produces an electrical control signal having a magnitude at least equal to a predetermined magnitude. The predetermined magnitude is produced by the difference-amplifying means 16 when the difference between the reference voltage and the output voltage, for example, the collector voltage, is equal to and less than a predetermined minimum difference.

The output of the difference-amplifying means 16 is operatively coupled to a converting means 18. The converting means 18 converts the electrical control signal from the difference-amplifying means 16 into an input signal. The resulting input signal has an electrical characteristic of a preselected value when the electrical control signal is at a predetermined magnitude; namely, the difference between the reference voltage and the output voltage on the controlled output of the active device is less than a predetermined minimum difference.

In addition, the resulting input signal may have an electrical characteristic at a value different from said preselected value when the electrical control signal has a magnitude greater than the predetermined magnitude.

The converting means 18 applies the input signal to the control input of the active device, such as, for example, the base of the semiconductor 10. The input signal electrically operates the active device at conduction level to drive the output voltage, the collector voltage in this example, at an output voltage level which is representative of the electrical characteristic of the input signal. Generally, the input signal drives the active device at a conduction level where the output voltage is substantially equal to the reference voltage. When this occurs, the input signal is generally at its preselected value.

In FIG. 1, the converting means 18 in the preferred embodiment includes a modulated on-to-off ratio control pulse generator 20. The modulated on-to-off control pulse generator 20 produces control pulses having a first phase and a second phase. The second phase is the inverse of the first phase. The ratio of on time to off is a variable and is a function of the difference or electrical control signal from the difference-amplifying means 16. When the electrical control signal is at a predetermined minimum difference, the ratio of on-to-off time is at a predetermined value.

For purposes of discussion, the first phase is designated as output 22 and is identified by $f(t)$. The second phase output is designated as 24 and is identified by $f(t)$. Both phases of the modulated on-to-off ratio control pulses are operatively connected to control two separate and distinct circuits. These separate and distinct circuits are a driving circuit generally designated as 26 and an output circuit generally designated as 28. The characteristics or ratio of on time to off time of the pulses is a function of the magnitude of the control signal from the difference-amplifying means 16. An explanation of the driving circuit 26 operation will be considered first.

In the driving circuit 26, the first phase output 22 and the second phase output 24 are both applied as an input to a pulse to voltage converter 30. A circuit which is responsive to both the first phase input 22 and the second phase input 24 for generating an analog voltage output in response to modulated on-to-off ratio control pulses will be described in greater detail in FIG. 2.

The pulse to voltage converter circuit 30 is a means for generating an analog voltage having a magnitude determined by the ratio of on time to off time of the first phase control pulse, or of a second control phase which is an inverted first phase control pulse.

The analog voltage output from the pulse to voltage converter circuit 30 is applied as an input to a voltage to current converter 32. The voltage to current converter 32 may be any known voltage to current converter. The current output from the voltage to current converter 32 is utilized as $I_b$ current for the semiconductor 10. Thus, the drive control circuit 26 is completed by applying the current from the voltage from current converter 32 as the input current to the base of semiconductor 10.

It is readily apparent that by proper selection of variables, such as the amplification of operational amplifier 16, the ratio of on time to off time of the control pulses and the predetermined minimum difference between the reference voltage and the output voltage from the active device controlled output, the active device will be operated at a desired conduction level. Thus, the amplification or gain of a semiconductor can be measured at its operating collector voltage.

Referring now to the output circuit 28, the first phase control pulses 22 and second phase control pulses 24 are applied as inputs to a second independent pulse to voltage converter circuit 40. The pulse to voltage converter circuit 40 can be the circuit set forth in FIG. 2 and will be considered in greater detail in the explanation of FIG. 2.

The output of the pulse to voltage converter 40 may be used for a variety of output-indicating devices. For example, the output indicator 42 may be a meter scale for directly displaying the gain of the semiconductor 10 as a precise reading on a linear scale. If desired, the analog voltage output from the pulse to the voltage converter circuit 40 can be operatively connected as the input to a digital voltmeter 44. Also, if desired, the output from the digital volt meter can be operatively connected to a line printer 46, thereby enabling both a visual and permanent record of the beta or gain of the semiconductor 10 being analyzed by the apparatus.

The amplification-measuring apparatus of FIG. 1 has wide utility. For example, if one desired to quickly and accurately measure the gain of a large batch of transistors and desires to make a permanent record thereof, this can be quickly and easily accomplished with the apparatus of FIG. 1.

A typical operation would be that the user would have a quantity of semiconductors which would have an identification or serial number affixed to each for record purposes. The user merely inserts each transistor into the input means, a keyboard input means may be used to enter the transistor identification or serial number into the line printer. Thereafter, the test or amplification measurement is made by the circuit and the user obtains a visual output on the meter of the apparatus. In addition, a digital voltage output reading may be obtained on the digital volt meter 44 and the pertinent information is transmitted as a digital signal to the line printer 46 which permanently records the gain of the transistor being analyzed. It is readily apparent that the output of the digital volt meter 44 can be used as an input to a computer system for computerized recording of information.

Normally gain or beta measurements are made at rated voltages and currents set forth in a manufacturer's specification sheet. In addition, various gains or beta can be measured for a wide range of collector voltages and currents. Further, other data such as various leakage currents can be obtained if desired. Also, leakage current measurements can be used for measuring the heat transfer characteristics of transistors and heat sinks since the apparatus automatically operates the transistor at constant power. All of the above information can be permanently recorded by means of a line printer 46 or by direct input to a computer or other memory or storage device.

One other variation possible with the apparatus of the present invention includes use of an output stage 48 having leads which directly connected to the collector, base and emitter of the semiconductor 10. If desired, the user could connect a digital voltmeter or the like across the output stage 48 and make measurements of collector-base voltages and base-emitter voltages. Also, if desired, this information could additionally be used as an input to a computer, line printer or the like.

One unique feature of the preferred embodiment set forth in FIG. 1 and described above is that a semiconductor amplification-measuring apparatus embodying the teachings of the present invention may use a modulated on-to-off ratio control pulse generator to alternately drive the driving circuit 26 and the output circuit 28. In the preferred embodiment, the driving circuit 26 is isolated from loading by the separate output circuit 28.

The operation of the apparatus set forth in FIG. 1 is based on the concept that the gain of a semiconductor 10 is inversely proportional to its base current. In addition, the output circuit 28 operates on the principle that the control signal magnitude is a function of the gain of the semiconductor 10. Thus, it is necessary that the driving circuit 26 seek an operating level wherein the difference between the reference voltage and output voltage, collector voltage in this example, developed on the controlled output of the active device is preset to have at least a predetermined minimum difference enabling the driving circuit 26 to continually supply an input current to the active device.

Figure 2:
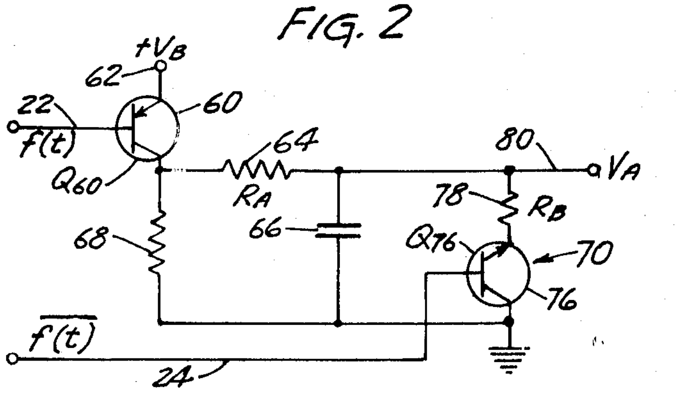
FIG. 2 is a schematic diagram illustrating a control means for converting modulated on-to-off ratio control pulses into an analog voltage.

FIG. 2 is a schematic diagram which illustrates a pulse to voltage converter capable of being used as the converters 30 and 40 of FIG. 1. The circuit of FIG. 2 performs its conversion function in response to the modulated on-to-off ratio control pulses. In its basic aspects, this converter circuit is responsive to on time ratio of digital pulses to generate an analog voltage having magnitude which is proportional to a time ratio of a digital pulse. In particular, the amplitude or magnitude of the resulting analog voltage produced by the circuit of FIG. 2 is determined by the on time to off time of the modulated on-to-off time ratio control pulses of either the first phase or second phase.

The circuit of FIG. 2 is a control means which is responsive to modulated on-to-off ratio control pulses having a first phase and a second phase for producing an analog voltage having an amplitude determined by the characteristics of the on-to-off time of the control pulses.

In the preferred embodiment of FIG. 2, the pulse to voltage converter includes a first semiconductor switching means which is capable of having its conduction state controlled by the on time of the first phase control pulse. In the illustrated embodiment of FIG. 2, the first semiconductor switching means is a PNP-transistor 60 having a base, emitter and collector. The first phase control pulse output 22 of FIG. 1 is applied as an input to the base of the transistor 60. The emitter of transistor 60 is electrically connected to the regulated voltage source having a voltage $V_B$, which is generally designated as 62. The regulated voltage supply 62 is capable of producing power supply voltage having substantially uniform amplitude independent of the conduction state of the transistor 60.

The collector of transistor 60 is operatively coupled to a first collector resistor 64. The collector resistor 64 is connected to a charge-accumulating means such as, for example, to one terminal of a capacitor 66. In addition, a resistor 68, which is used for fast transistor switching from saturation to cutoff, is operatively connected to the collector of transistor 60 and in parallel circuit relationship to the first collector resistor 64.

A discharge circuit generally designated as 70 is electrically connected in parallel across the capacitor 66. In this embodiment, the discharge circuit includes a second semiconductor means which is illustrated as a NPN-transistor 76 having an emitter, collector and base. The emitter of the transistor 76 is electrically connected to an emitter resistor 78.

The series-connected transistor 76 and the emitter resistor 78 are electrically connected in parallel across the capacitor 66. The second phase control output 24 from FIG. 1 is electrically connected to the base of the transistor 76. The collector of the transistor 76 is, in turn, connected to the common junction terminal of the capacitor 66 and the switching resistor 68.

The electrical control signal or analog voltage generally designated as $V_A$, and termed a control signal, is generated across the capacitor 66 and the discharge circuit 70. The analog voltage or control signal designated as $V_A$ appears across output terminal 80.

In operation, the circuit of FIG. 2 is responsive to the on time portion of the first phase control pulse occurring on output 22 which functions as the input to the transistor 60. The on time portion of the first phase pulse control renders the transistor 60 conductive for a predetermined duration, which duration is proportional to the on time duration of the control pulse. When the transistor is rendered conductive, the capacitor 66 accumulates a charge thereon, the magnitude of which is determined by the duration of conduction of transistor 60 and the value of resistor 64. The second phase control pulse on input 24 keeps transistor 76 nonconductive. Since the second is the inverse of the first phase, when the first transistor 60 is rendered nonconductive the charge or voltage on capacitor 66 is held. Immediately thereafter, transistor 76 is rendered conductive by the off time of the second phase clock pulse on input 24. This causes the charge on capacitor 66 to be discharged as a function of the duration of conduction of second transistor 76. Thus, the resulting analog voltage has an amplitude which is determined by the characteristics of the ratio of on time to off time of the modulated on-to-off ratio control pulses.

The above description relates to the operation of the pulse to voltage converter 30 of the driving circuit 26. However, in the pulse to voltage converter 40 of the output circuit 28, the first phase input 22 and the second phase input 24 are applied to the opposite semiconductor. Typical values for the elements in FIG. 2 are set forth in Table I:

TABLE I

| Element | Value |
|---|---|
| Transistor 60 (Q 60) | 2N 3645 |
| Resistor 64 | 3.698 M Ω |
| Capacitor 66 | 1.5 uf |
| Resistor 68 | 4.4 K Ω |
| Transistor 76 ($Q_{76}$) | 2N 3904 – (Select for low offset) |
| Resistor 78 | 32.4 K Ω |
| Ratio on to off time | 6:1 and 1:6 |
| $+V_B$ | 50 V.D.C. |
| $+V_A$ | Varies between 100 MVD.C. and 4 V DC |

The mathematical equation for the circuit of FIG. 2 may be expressed as follows:

$$V_A = \frac{V_B - VCE(SAT)}{1 + \frac{T_a}{T_b}\frac{R_a}{R_b}} \qquad (1)$$

wherein $T_a$ is time $Q_{60}$ is off and $Q_{76}$ is on, $T_b$ is time $Q_{60}$ is on and $Q_{76}$ is off, and the voltages $V_A$, $V_B$ and resistors $R_A$ and $R_B$ are the components illustrated in FIG. 2 having the values set forth in Table I above, and wherein $V_{CE}$ is the saturation voltage of transistor $Q_{60}$.

Figure 3:
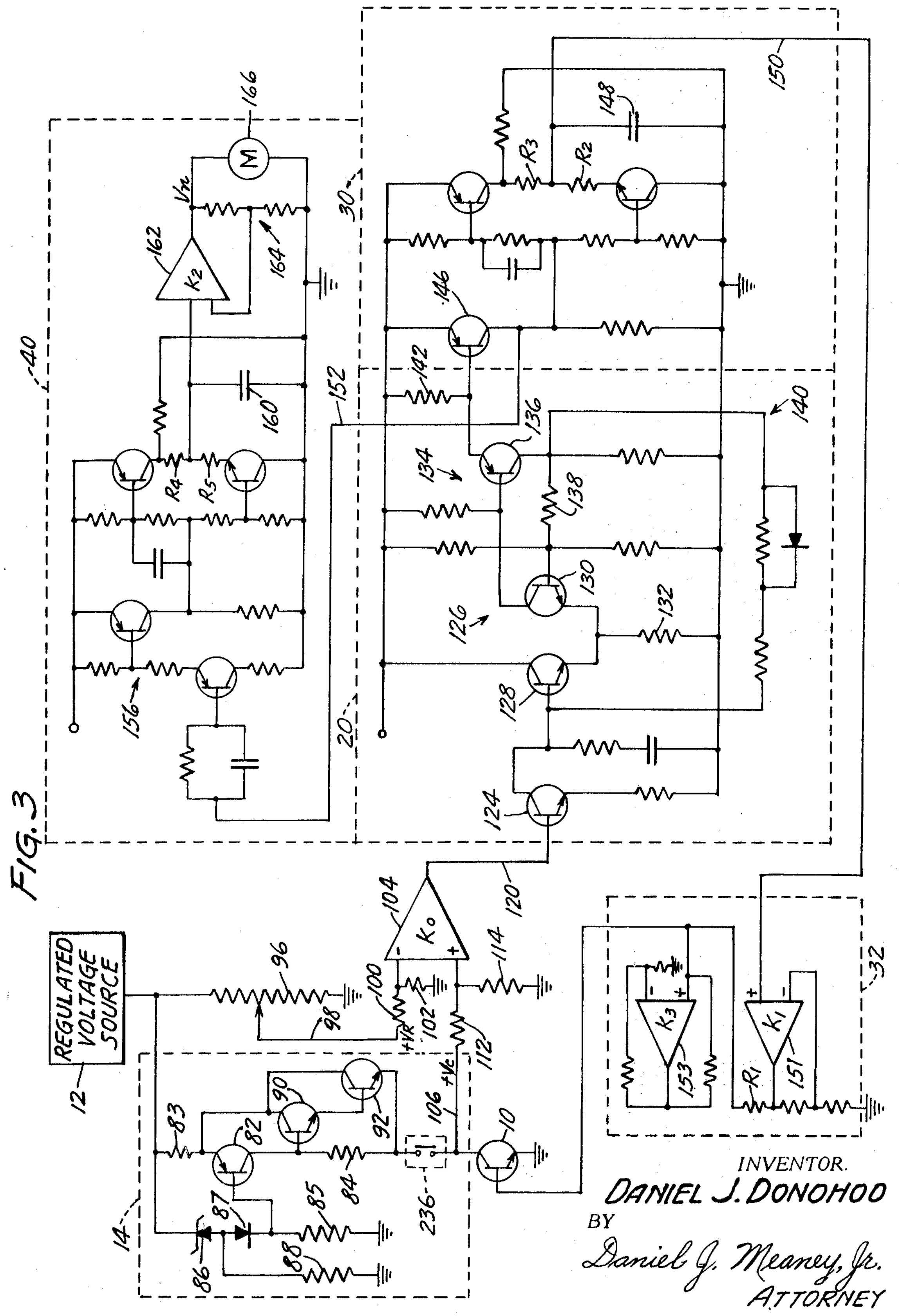
FIG. 3 is a schematic diagram illustrating circuitry for accomplishing the amplification measurement of the semiconductor as illustrated in FIG. 1.

FIG. 3 is a schematic diagram, partially in block form, illustrating transistor circuits which may be used in the system illustrated in FIG. 1.

The constant current source 14 illustrated in both FIGS. 1 and 3 can be formed of a PNP-transistor 82. Transistor 82 has its emitter electrically connected via resistor 83 to the regulated voltage source or power supply 12, its collector electrically connected via resistor 84 to the collector of a semiconductor 10 being analyzed, and its base electrically connected to a voltage-dividing network formed of a voltage-dividing resistor 85, a Zener diode 86 and a conventional diode 87 connected back-to-back with Zener diode 86. A Zener diode biasing resistor 88 is connected between the anode of Zener diode 86 and diode 87 and ground. In addition, a cascaded power drive amplifier is formed using two NPN-transistors 90 and 92. The collector of transistor 90 and transistor 92 are connected to the emitter of transistor 82 while the base of transistor 90 is connected to the collector of transistor 82. The emitter of transistor 90 is connected to the base of transistor 92 while the emitter of transistor 92 is connected via a switch 236, if any, to the collector of semiconductor 10 being tested.

The regulated power supply 12 includes a variable resistor 96. The reference voltage $+V_R$ from the variable resistor 96 appears on a conductor 98 which is connected via a voltage-dividing network formed of resistors 100 and 102 as an input to an operational amplifier 104.

A second input to the operational amplifier 104 is the voltage $+V_c$ developed across the collector-emitter junction of the semiconductor 10. This voltage occurs on a lead 106 which is also connected via a voltage-dividing network formed of resistors 112 and 114 as a second input to the operational amplifier 104. Thus, the operational amplifier 104 concurrently receives both a reference voltage $+V_c$ and a controlled output voltage $+V_c$ from the semiconductor 10. The output of the operational amplifier 104 appears on lead 120 as an electrical control signal. This electric control signal is used as an input to the modulated on-to-off ratio pulse generator generally enclosed by dashed lines 20.

The circuit which forms the modulated on-to-off ratio control pulse generator 20 will now be described. The control signal appearing on input 120 is applied to an NPN-transistor 124 which amplifies the voltage signal appearing thereon and applies the same as an input to one side of a saturating differential amplifier 126. The magnitude of the control signal is determined by the difference between the reference voltage $V_R$ and the output voltage $V_c$. If the difference is less than a predetermined minimum difference, the control signal has a predetermined minimum amplitude. If the difference is greater than a predetermined minimum, the output voltage $V_c$ is not substantially equal to the reference voltage and the operation of the semiconductor 10 must be varied. Thus, the electrical control signal has a magnitude greater than the predetermined difference and an absolute magnitude determined by the magnitude of the differences between the voltages.

Saturating differential amplifier 126 is formed of transistors 128 and 130. The output of transistor 124, together with any other signals applied to the base of transistor 128, control operation of the differential amplifier 126 by a common emitter resistor 132.

The other side of the differential amplifier 126, which includes transistor 130, is operatively connected to a switching circuit 134 which includes a PNP-transistor 136. The collector of transistor 136 is electrically connected by a resistor 138 to the base of transistor 130 forming the other side of the differential amplifier 126. The collector of transistor 136 is also connected in a regenerative feedback circuit 140 which is, in turn, connected to the base of transistor 128, forming the other side of the differential amplifier 126, and to the switching stage 134. The regenerative feedback circuit 140 and the differential amplifier 126 cooperate to function as an oscillator which serves as the control pulse generator. The duration of the control pulses appearing on the emitter of transistor 136 of the switching stage 134 are a function of the voltages on lead 120 and from regenerative feedback circuit 140.

The output voltage from the switching stage 134 is developed across an emitter resistor 142. The output voltage controls the pulse to voltage converter circuit generally enclosed by dash lines 30 of FIG. 3. Since the operation of the pulse to voltage converter 30 has been described in FIG. 2, a discussion thereof need not be presented here. It will be readily apparent that the pulse to voltage converter circuit 30 includes a switching transistor 146 wherein its collector is used to develop the first phase and second phase control signals for controlling conduction of the first semiconductor device and second conductor device in the pulse to voltage converter circuit.

The analog voltage developed by the pulse to voltage converter 30 is developed across capacitor 148. This analog voltage is applied via lead 150 and an operational amplifier 151 to a second operational amplifier 153. The operational amplifiers 151 and 153 function as the voltage to current converter of FIG. 1 and provides the $I_b$ or base current for the semiconductor 10.

Referring again to the pulse to voltage converter circuit 30, the collector of transistor 146 is also connected by a lead 152 the input of the second or output circuit pulse to voltage converter circuit generally enclosed by dash lines 40.

Lead 152 has thereon both the first phase and second phase control pulses.

The signals occurring on lead 152 are applied through a pulse-shaping circuit generally designated as 156 and are then applied to the first semiconductor device and second semiconductor device of the second pulse voltage converter circuit. Since this circuit has been described in detail in FIG. 2, a detailed explanation of its operation at this point is not deemed necessary.

An analog voltage is developed by the pulse to voltage converter circuit 40 will appear across capacitor 160. The analog voltage appearing across capacitor 160 is then applied as one input to an output operational amplifier 162. The second input to the amplifier 162 is developed from a voltage-dividing network 164. The analog voltage $V_m$ from amplifier 162 is applied as an input to meter 162.

It is understood that the analog voltage, $V_m$, developed across the output of amplifier 162 can be used as the input voltage for other devices such as, for example, the digital voltmeter 44 of FIG. 1.

The modulated on-to-off ratio control pulse generator 20 disclosed in FIG. 3 can be varied in design or in electrical components as deemed necessary to vary the ratio to off time to on time and the phase relationship between the first phase and the second phase control pulses.

Also, it is readily apparent that if it is desired to test the semiconductor device 10 of FIG. 3 at various collector currents, $I_c$, and at various collector voltages $V_c$, these values can be determined or controlled by changing the value of resistor 83 and by adjustment of the variable resistor 96.

In order to show this concept mathematically, the following equations and derivations thereof are presented to support the operating features of FIG. 1.

2. $B=I_c/I_b$ where $B$ = gain or amplification of semiconductor;

$I_c$ = collector current; and $I_b$ = base current.

$$B=\frac{I_cR_1}{K_1V_B}\left(1+\frac{R_3T_2}{R_2T_1}\right) \qquad (3)$$

Where $R_1$ = resistance between output of amplifier 151 and input of amplifier 153 of FIG. 3;

$V_B$ = power supply voltage;

$K_1$ = gain of operational amplifier 151 in the driving circuit;

$R_2$ and $R_3$ = resistors in pulse to voltage converter as illustrated in FIG. 3;

$T_1$ = on time of modulated on-to-off ratio control pulses having first phase;

$T_2$ = on time or modulated on-to-off ratio control pulses having a second phase; and wherein leakage current is negligible and neglected.

$$V_m=\frac{K_2V_B}{1+\frac{R_4T_1}{R_5T_2}} \qquad (4)$$

where $V_m$ = output voltage in the output circuit;

$K_2$ = gain of operational amplifier 162 in output circuit; and $R_4$ and $R_5$ = resistors in pulse to voltage converter 40 as illustrated in FIG. 3.

Transpose and solve Equation 3 for $T_1/T_2$ and substituting $T_1/T$ in Equation 4 yields the following system equation for the output circuit as a function of $B$:

$$V_m=\frac{K_2V_B}{1-\frac{R_4R_3I_cR_1}{R_5R_2(K_1BV_B-I_cR_1)}} \qquad (5)$$

The value of $I_cR$ can be made very small compared to $K_1BV_B$. Also, the remaining portion of the denominator can be made larger than the 1 and the 1 can be neglected. This results in the B being a portion of the nominator yielding the condition that $V_M$ is substantially proportional to $B$.

Accuracy of $B$ in a readout mode can also be made a dynamic function of the portion of the scale being used for readout. If one utilized equation 5, the system equation, and assumed that $T_1=T_2$, the system is calibrated for a certain gain beta ($B$). If desired, readings of $B$ at other than at rated $B$ can be made accurate by making a dynamic compensation for error of readout. This is achieved by varying the ratio of $T_1$ to $T_2$. The ratio of $T_1$ to $T_2$ can be optimized as a function of the scale or range to be used for readout.

The general system equation 5 may be modified to reflect a dynamic error readout correction feature. This is mathematically shown by assuming $T_2=T_1$, and that B is calibrated at rated conditions; namely, rated $V_c$ and $I_b$ current. The equation for B at these conditions is as follows:

6 $B=B_c=I_c/I_b$ where $B_c$ = calibrated point of B on a linear scale;

7 $B_c/B_M=\frac{1}{\sqrt{r}}$ where $B_M$ = maximum $B$ on a linear scale and $r$ equals range defined by the following equation:

8 $R=Y/X$ wherein $Y$ is defined as the maximum value of the linear scale on the desired range; and $X$ is defined as the minimum value of the linear scale on the desired range.

For calibration purposes, one can make $T_2$ equal to $T_1$ to determine the voltage $V_c$ that should be on the collector at calibrated beta $B_c$. The value for $V_c$ at this condition can be developed by the following set of equations:

$$V_c=\frac{V_B}{1+\frac{R_4}{R_5}}=\frac{V_B}{1+\frac{R_3}{R_2}} \qquad (9)$$

wherein $V_c$ equals required voltage across the controlled output of the active device.

Thus, if $R_4/R_5$ is made equal to $R_3/R_2$, equation 9 can be reduced as follows:

$$\frac{R_4}{R_5}=\frac{R_3}{R_2}=\frac{V_B-V_c}{V_c} \qquad (10)$$

Rewriting Equation 6 as follows:

11 $I_B=I_c/B_c$;

and rewriting Equation 3 as follows with $T_2=T_1$ yields:

$$I_B=\frac{K_1V_B}{R_1\left(1+\frac{R_4}{R_5}\right)}; \qquad (12)$$

and rewriting Equation 9 as follows yields:

$$\frac{\left(1+\frac{R_4}{R_5}\right)-1}{V_B}=V_c \qquad (13)$$

and substituting Equation 13 into Equation 12 and solving for $K_1$ yields:

14 $K_1=I_c\,R_1/B_c\,V_c$

Based on the above, the value of $V_M$, the analog output voltages can be obtained by substituting Equation 10 and Equation 14 into Equation 5, yields the following actual working equation for a readout system:

$$Vm=\frac{K_2V_B}{1-\frac{(V_B-V_C)^2}{V_C}\,\frac{1}{\frac{BV_B-1}{B_CV_C}}} \qquad (15)$$

The utility of such a circuit becomes evident when one desires to use the same meter for measuring semiconductors having a wide range of gains. By using these teachings, one can optimize Equation 15 to provide a predetermined fixed percentage error of readout for each point on the linear scale. For example, a 1 percent error or an absolute error of 10 at full scale for a transistor having a gain in excess of 1,000 is negligible. However, at lower gains, say 25 to 100, an error of 1 percent full scale becomes significant. The transistor analyzer of this invention can be programmed so that readout error is a function of the portion of the linear scale used for readout and not a function of full scale readout. This enables one to obtain highly accurate and error-compensated readout for each point on a linear scale rather than just at full scale.

This compensating feature is merely one application of the broad concept of using a driving circuit in a loop to generate an input signal for operating the active device at a selected operating level. Also, the use of a modulated on-to-off ratio control pulses having a first phase and a second phase to alternately drive a driving circuit and an output circuit independently of each other provides a means for dynamically correcting readout error. Concurrently, the same control pulses operate both the active device and an output circuit without loading the active device.

The circuitry of the present invention can be further modified to include elements for measuring the leakage current of certain semiconductors, such as, for example, silicon-type NPN- or PNP-transistors. A typical circuit for measuring leakage currents is set forth in FIG. 4.

Figure 4:
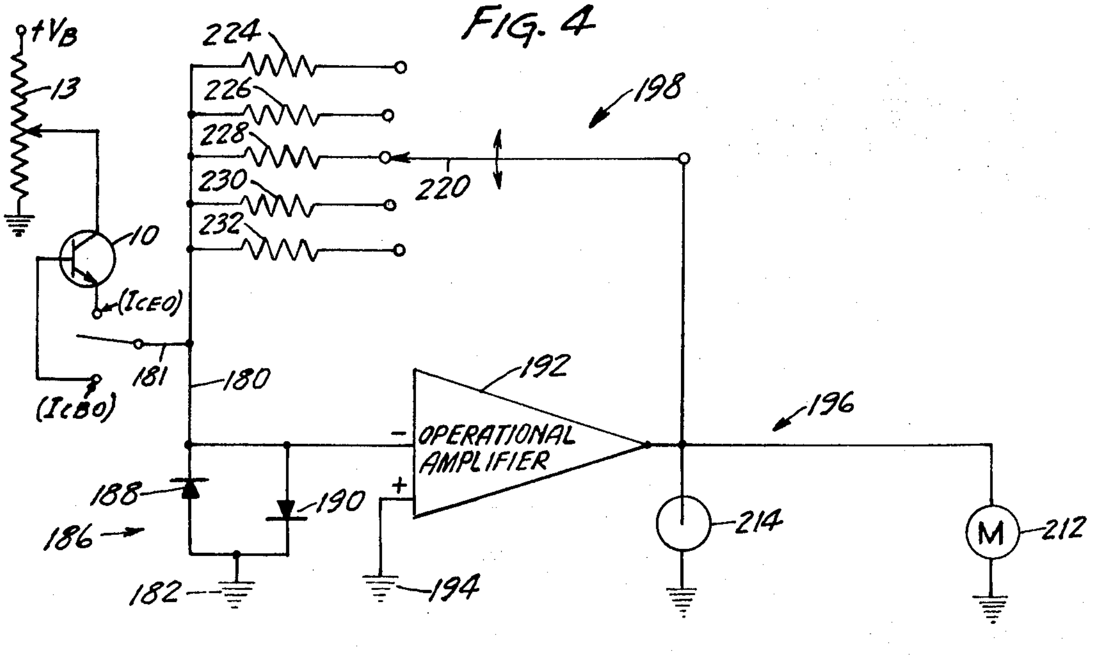
FIG. 4 is a schematic diagram illustrating one embodiment of a leakage current measuring circuit capable of being used with the circuitry of FIG. 3 for measuring leakage current of a semiconductor.

Referring now to FIG. 4, the leakage current normally measured in such silicon-type transistors and $I_{ceo}$ and $I_{cbo}$. Typically, these leakage currents are extremely low, somewhere around 10 nanoamps to 100 microamps or greater. The capability of measuring the leakage current at conditions set forth in the manufacturer's specifications sheet is most important. By making measurement of leakage current at rated collective voltages and collector and base currents, one can easily grade, classify or compare each individual transistor or semiconductor being tested to the operating specifications for that particular transistor issued by the manufacturer.

Referring back again to FIG. 4, the leakage current to be measured can be selectively switched from semiconductor 10 on to an input lead 180 via pole member 181.

A pair of back-to-back, connected diodes 188 and 190 are electrically connected between lead 180 and ground 182, provide protection to the minus (−) input side of an operational amplifier 192. The other input to the operation amplifier 192, designated as a positive (+) input, is electrically connected to a ground 194. The output of the operational amplifier 192 is then connected into two separate circuits; namely, an output circuit generally designated as 196 and a negative feedback circuit generally designated as 198.

The circuit 196 is formed of a meter 212 and an output jack 214 connected in parallel to the meter 212.

The feedback loop 198 includes a switchable output generally designated as 220. The switchable output 220 is selectively connected to a plurality of feedback loop resistors 224 through 232. The appropriate resistor to be electrically connected to the switchable output 220 depends on the range to be used for measuring the leakage current. The current into the minus (−) input to the operational amplifier 192 develops a voltage across the feedback resistor, i.e., one of resistors 224–236, connected into the feedback circuit 198. This voltage so developed is a feedback voltage which is added to the voltage on input 180. In this manner, the transistor apparatus of FIG. 1 can be easily extended in capabilities by using the common elements, such as the operational amplifier seen in FIG. 1, for performing a dual function, namely for measuring gain or beta in one application and for measuring the leakage current in a second application. The measurement of leakage current does not require use of the modulated on-to-off ratio control pulse generator 20, and is therefore a voltage-indicating circuit. However, the simplicity thereof and the use of the same operational amplifier for performing both functions enables the maximum use of the various elements of a multipurpose analyzer.

Other unique and desirable features can be incorporated into the circuitry of FIG. 3. If desired, one could further include a test button, as illustrated by dash Box 236 in FIG. 3, to selectively control the duration of testing of the semiconductor 10. The test circuit 236 could be automated such that closure thereof initiates an automatic timing cycle so that the testing time of each transistor is limited enabling high volume of testing. Also, if desired, the testing sequence could be completely automated whereby an operator merely inserts a semiconductor device 10 to be tested into the apparatus an automatic cycling means via the test circuit 236 selectively tests the device enabling recording of information derived from the semiconductor 10 during the testing cycle.

By use of a regulated voltage supply, one is able to establish a precise setting of the voltage by means of variable resistor 96. Also, a constant current can be produced by the constant current source 14 so that once the apparatus in FIG. 3 is set up for testing, the voltage and currents applied to the circuit and semiconductor being tested is programmed into the apparatus. Thus, the voltages and currents will remain constant regardless of load or voltage fluctuations thereby enabling the operator to immediately use the apparatus without need for recalibration or resetting of voltage and current levels. Again, this has utility in an operation where the characteristics of a large number or batch of transistors are to be analyzed.

In application, the apparatus of the present invention was found to have utility in circuit design work; particularly where one is interested in knowing operating parameters of a circuit and transistors used therein. The design parameters of a circuit are controlled by the gains of the transistors used therein relative to the variance of gains permitted by the manufacturer's specifications. Thus, the transistor amplification-measuring device illustrated in FIGS. 1 and 3 enables a user to selectively test a large batch of transistors or to select the maximum-minimum gain transistors of a batch for circuit design purposes. Also, if one requires matched transistors with respect to gain, leakage current and base emitter drops and the like, the transistor amplification-measuring device and apparatus of the present invention provides a unique and simple means for matching said transistors.

What is claimed is:

1. A control means responsive to modulated on-to-off ratio control pulses having a first phase and a second phase, which is the inverse of said first phase, for producing an analog output voltage having an amplitude determined by the ratio of on-to-off time of said first and second control pulses, said control means comprising
   - a first switching means capable of having its conduction state and duration thereof controlled by said first phase control pulses;
   - a regulated voltage source operatively coupled to said first switching means, said regulated voltage source being capable of producing a power supply voltage having a substantially uniform amplitude independent of the conduction state of said first switching means;
   - means operatively connected to and responsive to said first switching means being rendered conductive for accumulating from said regulated voltage source an analog voltage having an amplitude capable of reaching a maximum substantially equal to said power supply voltage amplitude and determined by the duration said first switching means is rendered conductive by the on time of said first phase control pulses; and
   - discharging means operatively coupled to said accumulating means and responsive to the on time of said second phase control pulses for discharging from said accumulating means a predetermined portion of said analog voltage to establish from said accumulating means an analog output voltage having an amplitude determined by the ratio of on-to-off time of the first and second control pulses.

2. The control means of claim 1 wherein said discharging means includes a second switching means capable of being rendered conductive by the on time of said second phase control pulses.

3. The control means of claim 2 wherein said first switching means is a first semiconductor device, said second switching means is a second semiconductor device and said accumulating means is a capacitor.

4. The control means of claim 3 wherein said control pulses are capable of being concurrently applied to said first and second semiconductor devices to simultaneously drive said first semiconductor device into conduction during the on time of said first phase control pulse and to drive said second semiconductor device into cutoff during the on time of said first phase control pulse.

5. The control means of claim 3 wherein said power supply voltage from said regulated voltage source has a positive polarity, said first semiconductor device is an PNP-transistor, said second semiconductor device is an NPN-transistor.

6. The control means of claim 3 wherein said second semiconductor device when rendered conductive generates an offset voltage thereacross having a magnitude which produces a negligible error in said analog output voltage.

7. The control means of claim 3 wherein said first semiconductor device when driven into saturation produces a saturation voltage thereacross which is negligible relative to said reference voltage and wherein variations in the magnitude of the saturation voltage, as a function of temperature, produces a negligible error in said analog output voltage.

8. The control means of claim 3 further comprising
- a first resistor electrically connected in series between said first switching means and said capacitor; and
- a second resistor electrically connected in series with said second switching means across said capacitor;
- said first resistor and said second resistor each being selected to have a resistance wherein the ratio of the resistance of said first resistor to the resistance of said second resistor is substantially greater than unity.

9. The control means of claim 8 wherein the magnitude of said analog output voltage is determined by the magnitude of the reference voltage divided by the quantity of unity plus the ratio of the resistance of said first resistor to the resistance of the second resistor times the ratio of the on time to the off time of said first phase control pulse.

10. The control means of claim 8 wherein the magnitude of said analog output voltage is determined by the magnitude of the power supply voltage divided by the quantity of unity plus the ratio of the resistance of said first resistor to the resistance of the second resistor times the ratio of the off time to the on time of said first phase control pulse.

11. A digital-to-analog converter comprising
- a first semiconductor device having an emitter, collector and base;
- a regulated voltage supply operatively coupled to the emitter of said first semiconductor device, said regulated voltage supply being capable of producing a power supply voltage having a predetermined amplitude independent of the state of conduction of said first semiconductor device;
- a source of modulated on-to-off ratio control pulses having a first phase and a second phase wherein said second phase is an inverse of said first phase, said source of control pulses being operatively coupled to said base of the first semiconductor device to render said first semiconductor device conductive for a duration determined by the on time of said first phase control pulse;
- a first resistor operatively coupled to the collector of said first semiconductor device;
- a capacitor operatively coupled to said first resistor, said capacitor being responsive to said first semiconductor device being rendered conductive for accumulating from said power supply voltage an analog voltage having an amplitude capable of reaching a maximum substantially equal to said power supply voltage amplitude and determined by the duration said first semiconductor device is rendered conductive by the on time of said first phase control pulse;
- a discharge circuit operatively connected in parallel to said capacitor, said discharge circuit including
  - a second semiconductor device having an emitter, collector and base;
  - the base of said second semiconductor device being operatively coupled to said source of control pulses and adapted to receive therefrom said second phase control pulses for rendering said second semiconductor device conductive for a duration determined by the on time of said second phase control pulse;
  - a second resistor having a resistance less than the resistance of said first resistor operatively connected in series to the emitter of said second semiconductor device and to the emitter of said second semiconductor device and to said capacitor;
  - said second semiconductor device and said second resistor being operatively coupled in parallel circuit relationship across said capacitor with the collector of said second semiconductor device being connected to the capacitor on a terminal opposite to the terminal common to said first resistor to discharge said capacitor by a magnitude determined by the on time of said second phase control pulses for producing an analog output voltage across said capacitor having an amplitude which is determined by the ratio of the on time to the off time of said first and second control pulses.

12. The digital-to-analog converter of claim 11 further comprising
- a resistor operatively between the collector of said first semiconductor device and the common connection of said capacitor and the collector of said second semiconductor device, said collector resistor being responsive to the voltage on the collector of said first semiconductive device to substantially decrease the switching time required to drive said first semiconductor device from saturation to cutoff in response to the off time of said first phase control pulse.

* * * * *